W. E. NAYLOR

June 16. 1931. APPARATUS FOR HANDLING SAND IN FOUNDRIES Re. 18,106

Original Filed Feb. 7, 1927 4 Sheets-Sheet 1

W. E. NAYLOR

June 16, 1931. APPARATUS FOR HANDLING SAND IN FOUNDRIES Re. 18,106

Original Filed Feb. 7, 1927 4 Sheets-Sheet 2

Witness:
Chas. R. Knesch.

Inventors,
Walter E. Naylor
By Fred Gerlach
his Atty

W. E. NAYLOR

June 16, 1931. APPARATUS FOR HANDLING SAND IN FOUNDRIES Re. 18,106

Original Filed Feb. 7, 1927 4 Sheets-Sheet 3

Witness: Chas. L. Kousch

Inventors,
Walter E. Naylor
By Fred Gerlach
his Atty.

W. E. NAYLOR

June 16, 1931. APPARATUS FOR HANDLING SAND IN FOUNDRIES Re. 18,106

Original Filed Feb. 7, 1927 4 Sheets-Sheet 4

Witness:
Chas. L. Kausch.

Inventor:
Walter E. Naylor
By Fred Gerlach
his Atty.

Reissued June 16, 1931

Re. 18,106

UNITED STATES PATENT OFFICE

WALTER E. NAYLOR, OF CHICAGO, ILLINOIS, ASSIGNOR TO THE BEARDSLEY & PIPER COMPANY, OF CHICAGO, ILLINOIS, A CORPORATION OF ILLINOIS

APPARATUS FOR HANDLING SAND IN FOUNDRIES

Original No. 1,759,625, dated May 20, 1930, Serial No. 166,342, filed February 7, 1927. Application for reissue filed April 27, 1931. Serial No. 533,318.

The invention relates to apparatus for handling sand in foundries.

In connection with the operation of moulding machines, turn-tables are sometimes used to deliver the flasks to carry them away from the mould-filling machine. In the filling operation, it is customary to deliver an excess of sand in the flask and then strike off the excess to insure the complete filling of the flask. It also occurs in practice that considerable sand is spilled, either through misplacement of the flask or on account of the movements of the discharge head of the filling machine, particularly when the machine is of the sand-slinger type in which the head is horizontally movable over the flasks to effect delivery of the sand under pressure into all portions of a flask. This results in spilling of considerable sand on the turn-table.

The primary object of the invention is to provide a turn-table adapted for use with moulding machines, in which provision is made for expeditiously removing the spill to prevent it from interfering with the free use of the turn-table and for recovering it for re-delivery to the moulding machine if desired.

Other objects of the invention will appear from the detail description.

The invention consists in the several novel features hereinafter set forth and more particularly defined by the claims at the conclusion hereof.

Figure 1:
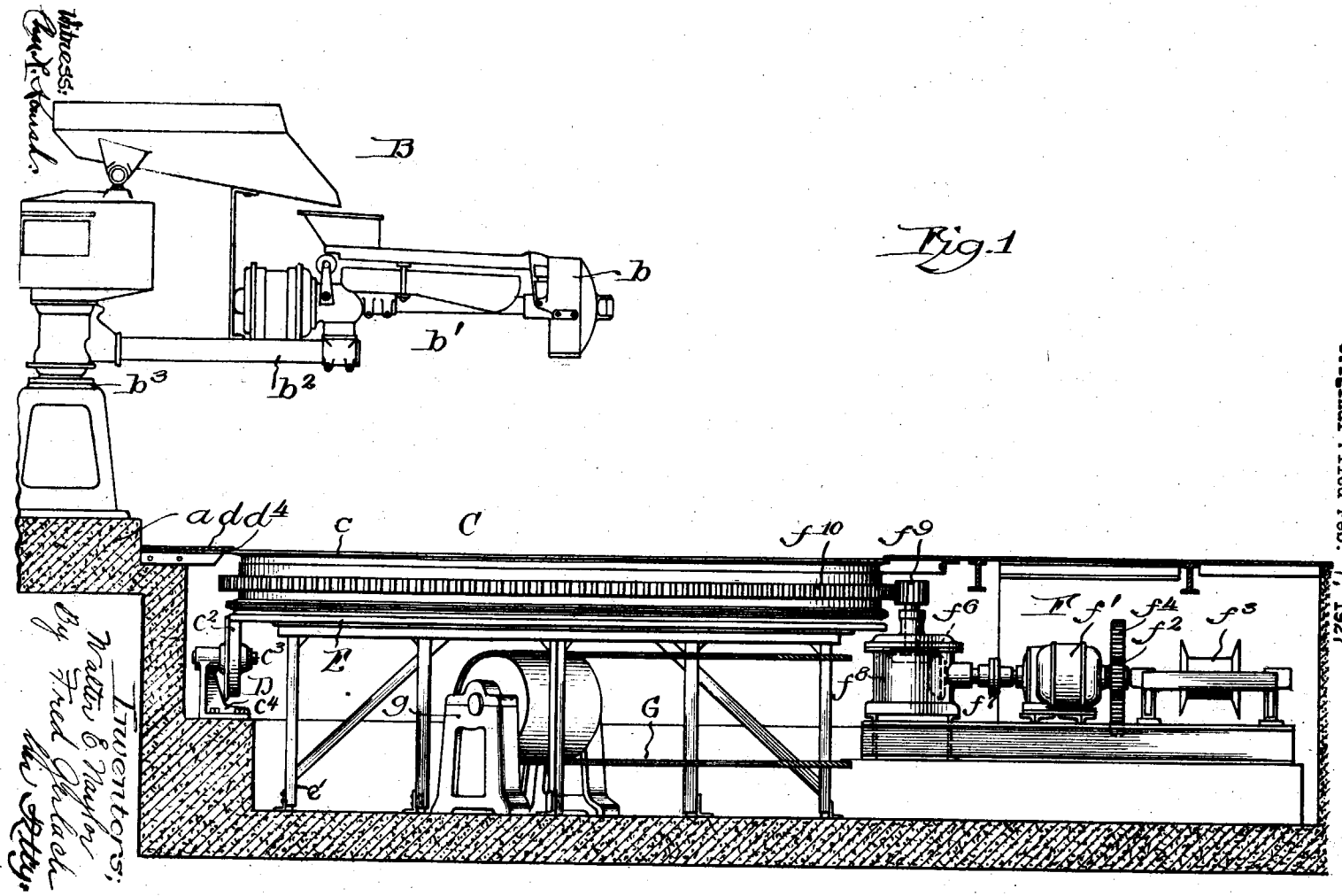
Figure 2:
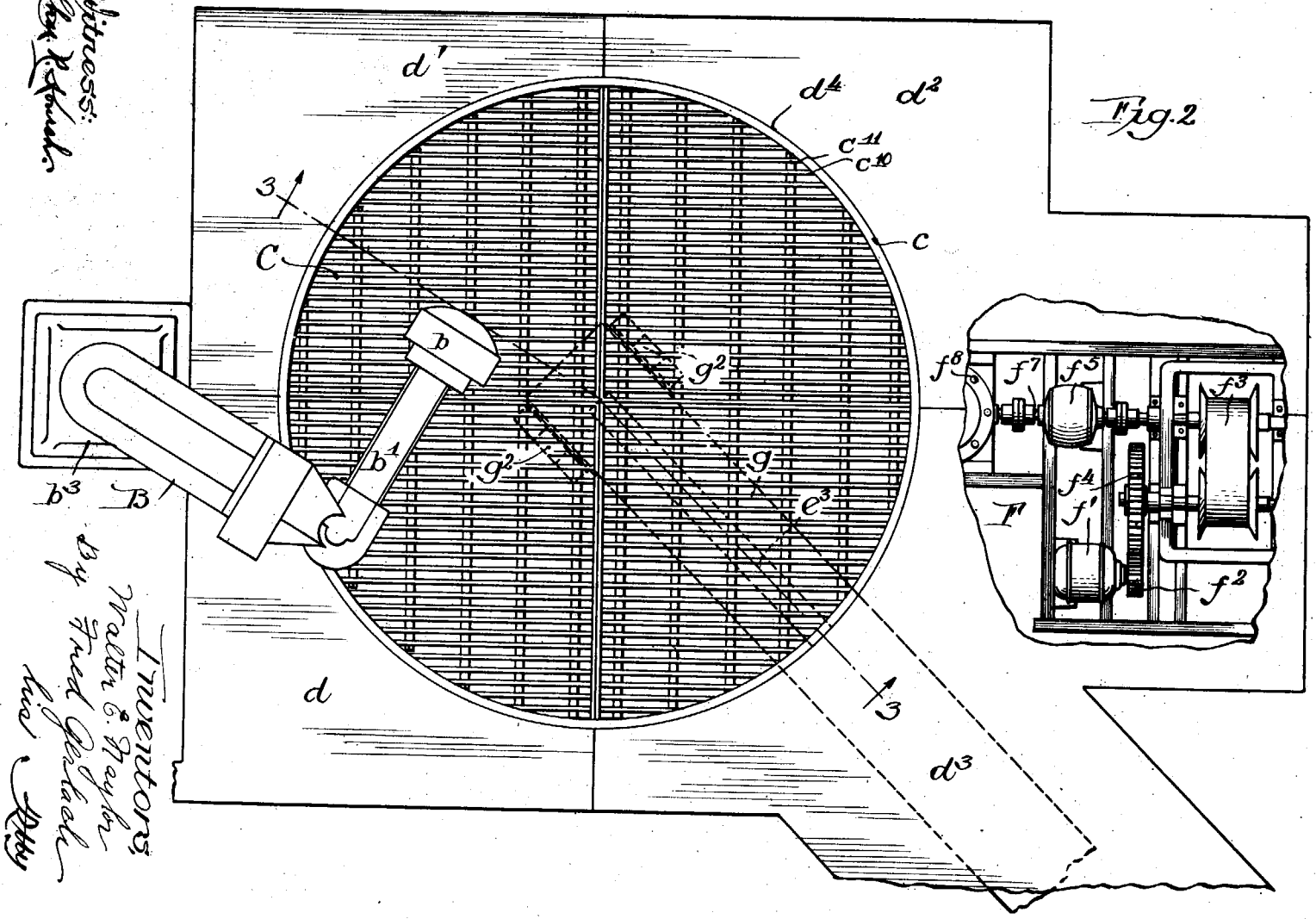
Figure 3:
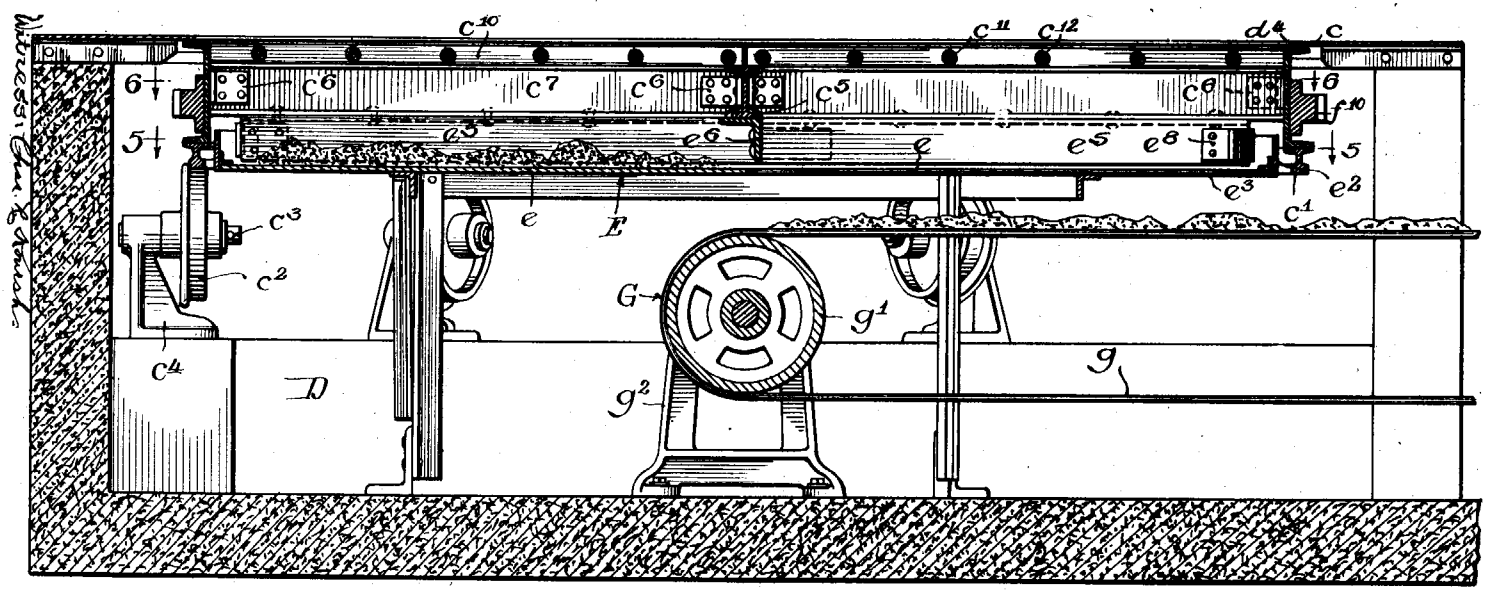
Figure 4:
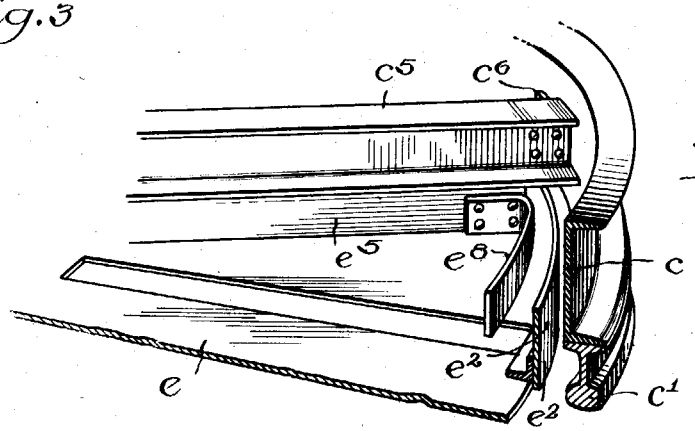
Figure 6:
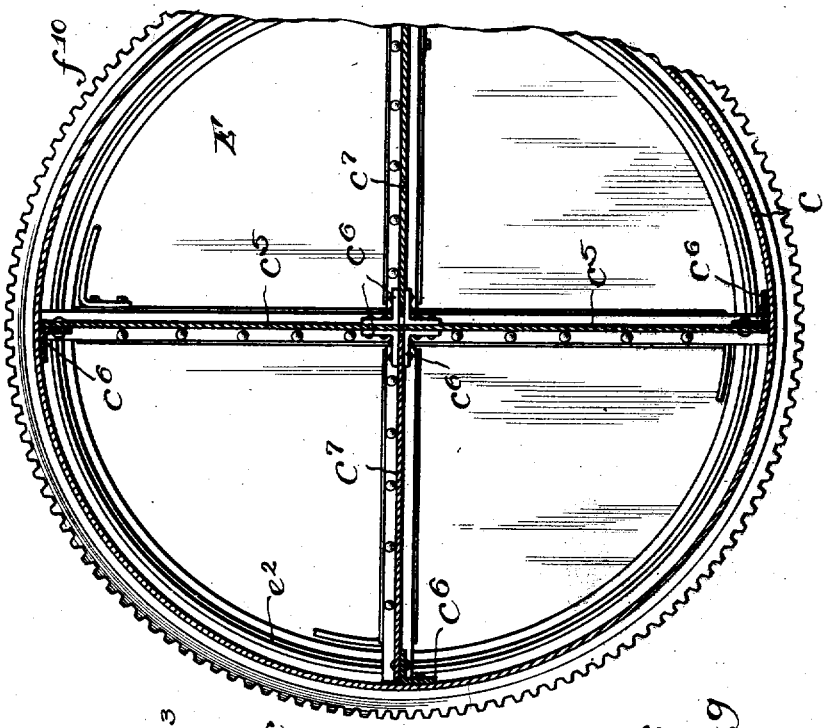
Figure 5:
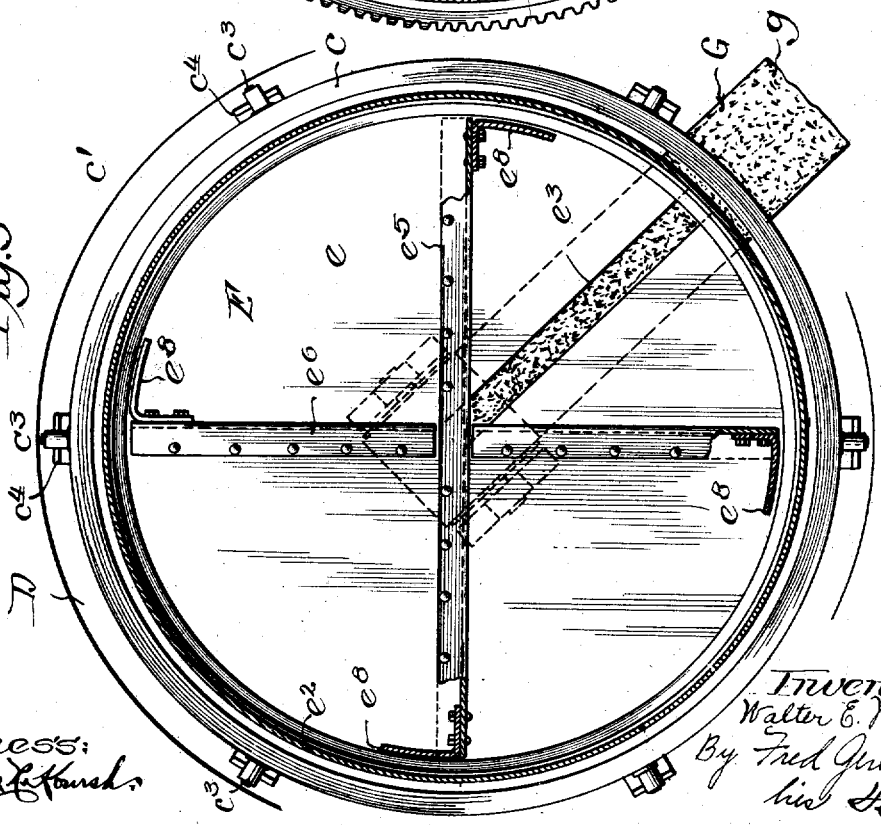

In the drawings: Fig. 1 is a side elevation of apparatus embodying the invention, the moulding room floor and pit therein being shown in section. Fig. 2 is a plan, parts being broken away to show the driving mechanism for the turn-table. Fig. 3 is a section through the turn-table, taken on line 3—3 of Fig. 2. Fig. 4 is a perspective of a portion of the turn-table frame and the stationary sand receiver below it. Fig. 5 is a section taken on line 5—5 of Fig. 3. Fig. 6 is a section taken on line 6—6 of Fig. 3.

The invention is exemplified in connection with the floor $a$ of a moulding room; a moulding machine B of the projector or sand-slinger type which comprises a projector head with a casing $b$ containing a high speed rotor for projecting sand vertically downward, the head being mounted on an arm $b'$ which is pivoted to the distal end of a jib $b^2$ which is pivoted to swing horizontally on a stationary standard $b^3$ so as to permit the head $b$ to be moved horizontally in any direction to discharge the sand into all portions of a subjacent flask; a turn-table C adapted to bring flasks into and out of receiving positions beneath the projector head; a pit D at the top of which the turn-table is mounted; a sand receiver E beneath the turn-table; power driven mechanism for driving the turn-table; and a conveyor G for conveying sand from the receiver E to any desired point for re-distribution. The moulding machine B illustrated is of the type exemplified in Patent No. 1,309,833 granted to Beardsley and Piper July 15, 1919, and the particular construction thereof forms no part of the present invention.

The walls and floor of the pit D and the floor $a$ of the moulding room are constructed of concrete. Plates $d$, $d'$, $d^2$, $d^3$ form a sectional cover or top for the pit which permit access thereto when necessary. This top is formed with a hole $d^4$ over, and concentric with, the turn-table C. The function of the turn-table is to support flasks and to convey the filled flasks away from the machine, so as to make it possible to keep the moulding machine supplied with flasks and expedite the filling of the flasks. In use, the flasks are delivered onto the turn-table at one side thereof, and in the course of rotation of the table, the flasks are passed under the machine and then to the other side of the machine where they are removed, thus making it possible to have an empty flask in position to be filled as soon as the preceding flask has been filled.

The turn-table comprises a ring $c$, preferably formed of a metallic channel; a circular inverted rail $c'$ adapted to run on rollers $c^2$ which are journalled on axles $c^3$ which are supported by brackets $c^4$ in the pit D; a cross-bar $c^5$, preferably an I-beam, having its ends fixedly secured by means of angle plates $c^6$ to the ring $c$; and bars $c^7$, preferably I-beams, extend between and are secured to the center of the cross-bar $c^5$ and to the ring $c$ by means of angle plates $c^6$. The top of the turn-table is disposed approximately at the level of the floor and consists of a grid formed of bars $c^{10}$ separated by spacing sleeves $c^{11}$ and secured together by bolts $c^{12}$. This grid is formed of quadrantal sections which are laid upon and supported by the bars $c^5$ and $c^7$, the outer margins of the sections conforming substantially to the inner periphery of the ring $c$. This grid forms an open-work rotatable support for flasks through which the spill and strike-off sand will pass instead of being permitted to cumulate on the turn-table. The sectional formation permits the grid to be readily lifted out of the ring when access to the subjacent parts is desired.

The turn-table is constantly rotated by the driving mechanism F which comprises an electric motor $f'$, the shaft of which is provided with a pinion $f^2$; a belt and pulley type of variable speed gearing $f^3$ driven by a gear $f^4$ which meshes with the pinion $f^2$; and enclosed reducing gearing $f^5$ driven by the gearing $f^3$; bevelled gearing $f^6$ driven through the shaft $f^7$ by the speed reducing mechanism $f^5$ and enclosed in a case $f^8$; a pinion $f^9$ driven by said bevelled gearing; and a gear-ring $f^{10}$ engaged and driven by the pinion $f^9$ and secured to the outer periphery of the ring $c$ of the turn-table. This exemplifies means for driving the turn-table with its grid top at different speeds.

The sand receiver E under the turn-table is adapted to receive the sand which passes through the grid, and comprises a bottom plate $e$ stationarily supported from the floor of the pit D by a suitable framework $e'$ and a marginal, vertical flange or ring $e^2$ fixedly secured to the bottom plate $e$. A radially extending discharge opening $e^3$ is formed in the bottom plate $e$, through which the sand will be discharged.

The sand passing through all portions of the turn-table grid will be caught by the receiver and will be shovelled or swept over the slot $e^3$ so that the sand will not accumulate in the receiver but will be discharged practically as fast as it is received. For the purpose of shovelling or sweeping the sand from all portions of the receiver to the discharge slot $e^3$, an angle bar $e^5$ is secured to the bottom of the bar $c^5$ and angle bars $e^6$ are secured to the bottom of the bars $c^7$. In their rotation, these angle bars scrape the sand over the bottom plate $e$ until it passes through the slot $e^3$. The outer ends of the bars $e^5$ and $e^6$ are each provided with a deflector $e^8$ to prevent the sand caught by the bars from being deflected outwardly against the flange $e^2$ of the receiver. The bars $e^5$ and $e^6$, rotating with the turn-table, operate continuously to discharge the sand through slot $e^3$.

The mechanism G comprises an endless conveyor belt $g$ and a pulley $g'$ for one end of the belt, rotatably mounted in brackets $g^2$ supported on the pit floor beneath the central portion of the turn-table. The belt $g$ extends longitudinally of the discharge slot $e^3$, so that the sand discharged from said slot will be caught by the belt and conducted to the desired point for re-delivery to the moulding machine or any other desired distribution.

The operation of the machine will be as follows: Flasks will be placed upon one side of the turn-table grid which will be continuously rotated by the mechanism F; as each flask is brought into position below the projector-head $b$, the operator will move the head over the flask to pack sand into all portions thereof; during this packing, considerable sand will be spilled and not directed into the flask and an excess of sand will be placed in the flask; the operator will strike off the excess from the flask, the spill and strike-off sand falling through the grid into the stationary receiver E; the filled flasks will be consecutively removed from the turn-table as they are filled; the sand in the receiver will be conveyed to the discharge slot $e^3$ so that it will fall onto the belt $g$ and conveyed to the desired point for re-delivery to the moulding machine or otherwise.

The invention exemplifies turn-table apparatus in which the turn-table comprises a grid on which the flasks are supported and through which the sand will fall into a receiver, from which it will be discharged to a conveyor for re-distribution.

As the result of the use of a grid, no sand is permitted to cumulate on the turn-table to interfere with the filling, placement, and removal of the flasks, and the spill and strike-off sand are conveniently disposed of. The mechanism is of such a character that it is well adapted to operate underneath a moulding room floor and facilitates the moulding operation by keeping the turn-table free from strike-off sand and spill.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In an apparatus of the character described, the combination with a floor having an opening therein, of a turn-table positioned in said opening and having the top thereof exposed so that flasks may be placed thereon for filling purposes and removed, said turn-table having openings through which the displaced flask-filling material will pass in lieu of cumulating thereon, mechanism for rotating the turn-table, and means under the table for catching the material that passes therethrough.

2. In an apparatus of the character described, the combination with a floor having an opening therein, of a turn-table disposed in the opening and exposed so that flasks may be placed thereon for filling purposes and removed, said turn-table having openings therein through which the displaced flask-filling material will pass in lieu of cumulating thereon, mechanism for rotating the turn-table, stationary means under the table for catching the material that passes therethrough, and a substantially horizontal conveyor disposed under said catching means for conveying the material therefrom.

3. In an apparatus of the character described, the combination with a floor having an opening therein, of a turn-table positioned within the opening and arranged substantially flush with said floor, said table being exposed so that flasks may be placed thereon for filling purposes and removed and comprising a grid through which the displaced flask-filling material will pass in lieu of cumulating thereon, mechanism for rotating the turn-table, stationary means under the grid for catching the material that passes therethrough, and means for conveying said material from the catching means.

4. In an apparatus of the character described, the combination with a floor, of a turn-table associated with the floor and exposed so that flasks may be placed thereon for filling purposes and removed, said turn-table comprising a grid of removable sections through which sand will pass in lieu of cumulating thereon, mechanism for rotating the turn-table, and means under the grid for catching the sand that passes therethrough.

5. In an apparatus of the character described, the combination with a floor, of a turn-table associated with the floor and having an opening therein through which sand will pass, mechanism for driving the turn-table, a sand receiver under the table having a discharge opening, and means operated by the turn-table for moving the sand in the receiver, to discharge it through said opening in the receiver.

6. In an apparatus of the character described, the combination with a floor, of a turn-table associated with the floor and comprising a grid, mechanism for driving the turn-table, a stationary sand receiver under the grid having a discharge-opening, and means rotatable with the turn-table for moving the sand in the receiver to said opening.

7. In an apparatus of the character described, the combination with a floor, of a turn-table associated with the floor and comprising a ring, bars in the ring, and a sectional grid removably held in the ring and on said bars, mechanism for driving the turn-table, a stationary sand receiver under the grid, and means on the bars for moving the sand in the receiver.

8. In an apparatus of the character described, the combination with a moulding room floor provided with an opening and a pit under said opening, of a turn-table in the pit and adjacent the floor comprising a grid for supporting flasks and through which sand will fall, mechanism for driving the turn-table, a sand receiver under the grid having a discharge slot therein, and means on the turn-table for conveying sand in the receiver to the slot.

9. In an apparatus of the character described, the combination with a moulding room floor provided with an opening and a pit under said opening, of a turn-table in the pit and adjacent the floor comprising a grid for supporting flasks and through which sand will fall, a roller-supported ring and bars in the ring, mechanism for driving the turn-table, a stationary sand-receiver under the grid comprising a plate having a slot therein, means on the bars for conveying sand on the plate to the slot, and a conveyor for carrying off the sand passing through the slot.

10. In an apparatus of the character described, the combination with a moulding room floor provided with an opening and a pit under said opening, of a turn-table in the opening and substantially flush with the floor comprising a ring, and a grid in the ring, said grid being adapted to support flasks and permitting sand to pass therethrough into the pit, rollers in the pit for supporting the ring, and mechanism for driving the turn-table.

11. In an apparatus of the character described, the combination with a moulding room floor provided with an opening and a pit under said opening, of a turn-table in the opening and substantially flush with the floor comprising a ring, bars in the ring, and a sectional grid removably held in the ring and on said bars, said grid being adapted to support flasks and permitting sand to pass therethrough into the pit, and mechanism in the pit for driving the turn-table.

12. In an apparatus of the character described, the combination with a floor having a pit therein, of a grid disposed in the top part of the pit and adapted to have flasks placed thereon for filling purposes and then removed and to have the flask-filling material that is displaced from the flasks, during filling thereof, pass therethrough, a substantially flat, horizontally extending receiver-element positioned beneath the grid and so as to catch the displaced flask-filling material passing through the grid, a supporting element disposed between the grid and the receiver-element, one of said elements being mounted so that it is rotatable horizontally, a member carried by the supporting element and operative, during rotation of the said one element relatively to the other element, to sweep the displaced flask-filling material off the receiver-element, means for rotating said one element, and conveyor-means in the pit arranged to receive the material as it is swept by the member from the receiver-element.

13. In an apparatus of the character described, the combination with a floor having a pit therein of a grid disposed in the top part of the pit and adapted to have flasks placed thereon for filling purposes and then removed and to have the flash-filling material that is displaced from the flasks, during filling thereof, pass therethrough, a substantially flat, horizontally extending receiver positioned in the pit beneath the grid in order to catch the displaced flask-filling material passing through the grid, horizontally movable means above the receiver operative, during movement thereof, to sweep the material off the receiver, and power-operated mechanism for moving the sweep-means for material-sweeping purposes.

14. In an apparatus of the character described, the combination with a floor having a pit therein, of a grid disposed in the top part of the pit and adapted to have flasks placed thereon for filling purposes and then removed and to have the flask-filling material that is displaced from the flasks, during filling thereof, pass therethrough, a substantially flat, horizontally extending receiver positioned in the pit beneath the grid in order to catch the displaced flask-filling material passing through the grid, horizontally rotatable means above the receiver operative, during rotation thereof, to sweep the material off the receiver, and mechanism for rotating the material-sweeping means.

15. In an apparatus of the character described, the combination with a floor having a pit therein, of a grid disposed in the top part of the pit and adapted to have flasks placed thereon for filling purposes and then removed and to have the flask-filling material that is displaced from the flasks, during filling thereof, pass therethrough, a substantially flat, horizontally extending receiver positioned between the grid in the bottom of the pit and so as to catch the displaced flask-filling material passing through the grid, horizontally rotatable means above the receiver operative, during rotation thereof, to sweep the material off the receiver, mechanism for driving the material-sweeping means, and an endless conveyor disposed in the pit and arranged to receive the material swept from the receiver by the aforesaid sweeping means.

16. In an apparatus of the character described, the combination with a floor having a pit therein, of a grid disposed in the top part of the pit and adapted to have flasks placed thereon for filling purposes and then removed and to have the flask-filling material that is displaced from the flasks, during filling thereof, pass therethrough, a horizontally extending, plate-like receiver for catching the displaced flask-filling material passing through the grid positioned between the grid and the bottom of the pit and having a discharge opening therein, horizontally rotatable means above the receiver operative, during rotation thereof, to sweep the material on the receiver through the discharge opening, and mechanism for rotating the sweeping means.

17. In an apparatus of the character described, the combination with a floor having a pit therein, of a grid disposed in the top part of the pit and adapted to have flasks placed thereon for filling purposes and then removed and to have the flask-filling material that is displaced from the flasks, during filling thereof, pass therethrough, a horizontally extending, plate-like receiver for catching the displaced flask-filling material passing through the grid positioned between the grid and the bottom of the pit and having a discharge opening therein, horizontally rotatable means above the receiver operative, during rotation thereof, to sweep the material on the receiver through the discharge opening, mechanism for rotating the sweeping means, and an endless conveyor positioned beneath the receiver so as to receive the material discharged by said sweeping means through the opening.

18. In an apparatus of the character described, the combination with a floor having a pit therein, of a circular grid positioned in the pit substantially flush with the floor and adapted to have flasks placed thereon for filling purposes and then removed and to have the flask-filling material that is displaced from the flasks, during filling thereof, pass therethrough, a horizontally extending plate-like receiver for catching the displaced flask-filling material passing through the grid, positioned between the grid and the bottom of the pit and having a discharge opening therein, a horizontally extending ring corresponding substantially in size to the grid, located above the receiver and mounted so that it is rotatable about its own axis, members carried by the ring and operative, during rotation of the latter to sweep the material on the receiver through the discharge opening, mechanism for rotating the ring, and an endless conveyor positioned beneath the receiver so as to receive the material as it is discharged by the members through the opening.

Chicago, Illinois, April 15th, 1931.

WALTER E. NAYLOR.